US010719107B2

(12) United States Patent
Song et al.

(10) Patent No.: US 10,719,107 B2
(45) Date of Patent: Jul. 21, 2020

(54) METHOD AND APPARATUS TO MAINTAIN NODE POWER BUDGET FOR SYSTEMS THAT SHARE A POWER SUPPLY

(71) Applicant: Intel Corporation, Santa Clara, CA (US)

(72) Inventors: Justin J. Song, Olympia, WA (US); Devadatta V. Bodas, Federal Way, WA (US); Muralidhar Rajappa, Chandler, AZ (US); Brian J. Griffith, Auburn, WA (US); Andy Hoffman, Olympia, WA (US); Gopal R. Mundada, Olympia, WA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/084,374

(22) Filed: Mar. 29, 2016

(65) Prior Publication Data

US 2017/0285702 A1 Oct. 5, 2017

(51) Int. Cl.
*G06F 1/00* (2006.01)
*G06F 1/26* (2006.01)
*G06F 1/3206* (2019.01)

(52) U.S. Cl.
CPC .............. *G06F 1/26* (2013.01); *G06F 1/3206* (2013.01); *Y02D 10/171* (2018.01)

(58) Field of Classification Search
CPC ...... G06F 9/4406; G06F 9/441; G06F 1/3206; G06F 1/3296; G06F 1/26; G06F 1/3203; G06F 11/2023; G06F 11/2025
See application file for complete search history.

(56) References Cited

U.S. PATENT DOCUMENTS

| 7,529,953 | B1 | 5/2009 | Conrad et al. |
| 7,992,021 | B2 | 8/2011 | Bahali et al. |
| 8,145,920 | B2 | 3/2012 | Tsai et al. |
| 2005/0102544 | A1 | 5/2005 | Brewer et al. |
| 2006/0282687 | A1 | 12/2006 | Bahali et al. |
| 2008/0036864 | A1 | 2/2008 | McCubbrey |

(Continued)

OTHER PUBLICATIONS

Yu, Li, et al., PuPPET: A New Power-Performance Modeling Tool for High Performance Computing, Journal of Parallel and Distributed Computing, vol. 84, pp. 1-14, Oct. 2015.

(Continued)

*Primary Examiner* — Xuxing Chen
(74) *Attorney, Agent, or Firm* — Womble Bond Dickinson (US) LLP

(57) ABSTRACT

A method and apparatus for node power regulation among nodes that share a power supply are described. In one embodiment, the apparatus comprises a power supply unit to provide input power and a plurality of nodes coupled to receive the input power, where each node of the plurality of nodes is operable to run power management logic, and wherein two or more nodes of the plurality of nodes alternate between performing power management and providing power regulation control information to other nodes of the plurality of nodes to regulate power consumption by the plurality of nodes, with, at any one time, only one node of plurality of nodes generating the power regulation control to regulate power for the plurality of nodes.

27 Claims, 6 Drawing Sheets

(56) References Cited

U.S. PATENT DOCUMENTS

| | | | |
|---|---|---|---|
| 2008/0151801 A1* | 6/2008 | Mizuta | H04W 52/343 |
| | | | 370/311 |
| 2011/0016337 A1 | 1/2011 | Cepulis | |
| 2011/0242356 A1 | 10/2011 | Aleksic | |
| 2013/0028091 A1* | 1/2013 | Sun | G06F 9/5083 |
| | | | 370/236 |
| 2013/0262906 A1 | 10/2013 | Munjal et al. | |
| 2014/0189376 A1 | 7/2014 | Rotem et al. | |
| 2014/0257729 A1 | 9/2014 | Wolf | |
| 2015/0185054 A1 | 7/2015 | Hesch et al. | |
| 2015/0189190 A1 | 7/2015 | Fung et al. | |
| 2015/0331470 A1 | 11/2015 | Goodrum et al. | |
| 2015/0381237 A1 | 12/2015 | Griffith et al. | |
| 2016/0043874 A1* | 2/2016 | Chen | H04L 12/12 |
| | | | 370/431 |
| 2016/0048712 A1* | 2/2016 | Butler | H04L 67/1097 |
| | | | 340/10.51 |

OTHER PUBLICATIONS

"The Growing Demand for Intelligent Power Management Control," Adaptive Computing, 2014. https://www.adaptivecomputing.com/wp-content/uploads/2015/08/Intelligent-Power-Management-Control.pdf.

PCT Application No. PCT/US2017/017029, International Search Report and the Written Opinion, dated May 24, 2017, 16 pgs.

International Preliminary Report on Patentability received for PCT Patent Application No. PCT/US2017/018137, dated Oct. 11, 2018 11 pages.

European Search Report for Application No. 17776122.8-1216/3436898, dated Oct. 14, 2019, 8 pages.

* cited by examiner

METHOD AND APPARATUS TO MAINTAIN NODE POWER BUDGET FOR SYSTEMS THAT SHARE A POWER SUPPLY

FIELD OF THE INVENTION

Embodiments of the present invention relate to the field of power management for computing systems; more particularly, embodiments of the present invention relate to performing power capping regulation for nodes in a computing arrangement.

BACKGROUND OF THE INVENTION

Systems providing services such as, for example, cloud services, often employ hundreds of thousands of servers to provide those services. Many servers are used for specific types of workloads or tasks. Depending on the tasks, power performance tradeoffs may exist. These systems include High Performance Computing (HPC) servers, cloud front and back-end servers, storage servers, communication servers, etc.

Server node density is increasing dramatically now and in the foreseeable future. In many designs, multiple nodes share common power supplies and are placed on one blade. Managing power for such nodes and blade servers is a key factor that affects nodes density and cost.

A number of power management technologies have been presented for such systems. For example, one traditional method for performing power management for server node or cluster arrangements is using a baseboard management controller (BMC). BMCs take up significant area on a server board—roughly 3 square inches per node board. Thus, using a BMC reduces the node board density since it increases the board area to make room for the BMC.

In another approach, a server rack uses a chassis manager to perform power management. In this case, such a chassis manager is either a dedicated node or a separate chassis management system, which complicates the rack level management system. This means either performance is compromised by losing space for nodes to accommodate this added management system or there are additional costs associated with its inclusion.

Both solutions discussed above involving the use of a BMC or a chassis manager is problematic to server suppliers. The server suppliers do not like the high cost of the BMC and chassis manager functional validation, as well as the additional validation efforts.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
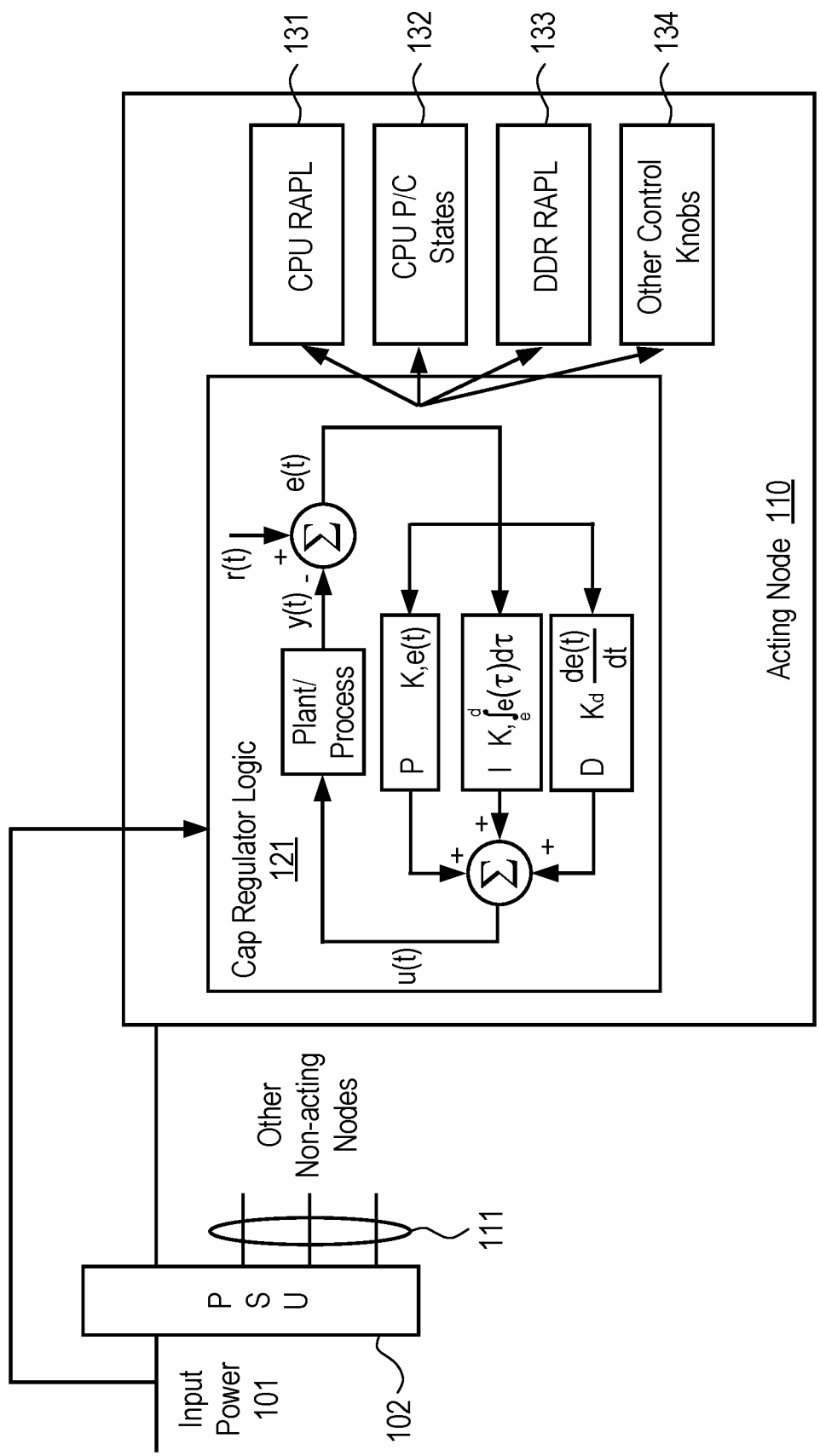
FIG. 1 illustrates a software-based server power capping arrangement.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Techniques are disclosed to control power consumption for servers and/or nodes that share a common power supply without the need of a BMC or chassis manager. In one embodiment, the techniques are used to maintain rack power and node power and achieve the same capabilities as traditional chassis manager and BMC.

In one embodiment, a power control techniques use in-band power management logic (e.g., hardware running software) that runs on every node. However, at any one time, only one node's power management logic reads the total power consumption of the group for nodes from one or more the shared power supply units (PSUs). This one node, referred to herein as the "acting node", performs computations to determine the total power of all the shared PSUs, and using power control knobs, makes power control parameters (e.g., decisions) to control its power level and passes those same power control parameters to other nodes to control their power level. For example, the power control parameters may specify that the power level should be changed. In one embodiment, the power control parameters include one or more of central processing unit (CPU) Running Average Power Limit (RAPL) power cap limits, memory (e.g., dynamic random access memory (DRAM) (e.g., double data rate (DDR) DRAM) RAPL power cap limits, and one or more power states (e.g., C-states, P-states). Other states may be included. For example, in another embodiment, one or more link states (e.g., L0, L1, L2, ... ), memory DVFS states (e.g., H0, H1, H2, ... ), thermal throttling states (e.g., T0, T1, T2, ... ), and/or device states (e.g., D0, D0i1, D0i2, ... , D1, D2, ... ) are included. In one embodiment, the power control parameters are determined according to the description in U.S. Patent application publication no. 20150381237, entitled "Methods and Systems for Server Power Line Communication, filed Jun. 30, 2014.

The other nodes, referred to herein as "non-acting nodes", do not use their in-band power management while another node is the active node. This reduced their overhead. These non-acting nodes simply receive power management control parameters (e.g., decisions) from the acting node and apply them.

In one embodiment, based on a protocol, each acting node operates for a certain period of time, and then becomes a non-acting node. Similarly, in one embodiment, each non-acting node at one point becomes the active node, and runs its power management logic for a period of time to generate power control parameters to control the other nodes. In another embodiment, only a subset of the nodes becomes the acting node. For example, if several nodes are faster than other nodes, or the overall power management overhead is low, then some faster nodes or specific nodes can be assigned to always be acting nodes.

The techniques described herein have a number of advantages. First, by using one of the nodes to perform the power management for all the nodes, the techniques save board area and development and validation costs of the BMC and chassis manager, which is roughly 3 square inches saved per node. The costs saving is highly dependent on OEM's design but is considered substantial. For smaller form factor boards used in emerging market segments such as telecommunications, this area saving is more beneficial. Also the BMC uses complicated power delivery which increases complexity of system design. Elimination of BMC can help reduce the design to market delay.

Moreover, these techniques work seamlessly with in-band resource management. It is extremely hard, if not impossible, for traditional BMC and chassis managers to work with in-band resource management. Due to this, these techniques can easily interface with a job power manager and a power aware scheduler and additionally delivers ~5% performance benefit.

Lastly, the techniques described herein take advantage of power supply sharing by many nodes and significantly reduces in-band power management overhead by (N−1)/N, where N is # of nodes sharing the common power supplies.

FIG. 1 illustrates a software-based server power capping arrangement. In this arrangement, an acting node takes input power from a power supply unit (PSU), computes and fine tunes power control logic parameters (e.g., PID control parameters), and then generate output power control parameters (e.g., decisions) that are used to control its power as well as that of the non-acting nodes. In one embodiment, the power control parameters include CPU and/or DDR Running Average Power Limit (RAPL), CPU C and/or P states, or other power control knobs that can be used to regulate node power. Note that this arrangement may be used in a server rack and/or may be part of a High Power Computing cluster.

Referring to FIG. 1, input power 101 is applied to both power supply unit 102 and each of the plurality of nodes, including acting node 110 and other non-acting nodes 111. In one embodiment, each of the nodes 110 and 111 includes power capping (cap) regulation logic, such as cap regulation logic 121 of acting node 110. In one embodiment, cap regulation logic 121 performs cap regulation by performing a number of calculations to determine whether the power should be capped. As a result of the calculations, cap regulation logic 121 generates a number of power control parameters (e.g., decisions) that are used to control its operation as well as the other non-acting nodes 111. These power control parameters are generated and sent to each of the other non-acting nodes 111.

In one embodiment, the power control parameters include CPU Running Average Power Limit (RAPL) 131, CPU P/CSTATE 132, and DDR RAPL 133. Acting node 110 provides these control decisions to other non-acting nodes 111. In one embodiment, acting node 110 provides other power control parameters in the form of control knobs 134 to other non-acting nodes 111 to control their operation. Control knobs 134 includes a number of settings which may be thought of as knobs. As used herein, "knob" refers to a virtual knob that can be set to a plurality of values. Examples of knobs that typically exist include, for example, knobs for selection, change, coordination, of frequencies, power states, idle states for:

a) CPU cores, uncores, Field-Programmable Gate Arrays (FPGAs), Application-Specific Integrated Circuits (ASICs), packages, sockets;

b) Input/output controllers, buses, devices (e.g., QuickPath Interconnect (QPI), UltraPath Interconnect (UPI), Front-side Bus (FSB), Double Data Rate (computer memory bus) (DDR), Peripheral Component Interconnect Express (PCIe), Inter-Integrated Circuit (I2C), Platform Environmental Control Interface (PECI), rings, etc.); and c) Fabric/communication controllers, buses, devices (e.g., Serial Advanced Technology Attachment (SATA), Serial-Attached SCSI (SAS), Universal Serial Bus (USB), Video, Ethernet (ETH), computer interconnects e.g., Stormlake and Infiniband, etc.)

As can be appreciated this myriad of knobs provides a number of possible permutations of knob settings that collectively provide tremendous granularity to the power-performance tradeoff decision. By providing greater control of the granular knob settings improved power-performance can be achieved.

Acting node 110 only uses its cap regulation logic 121 to perform power capping for all of the nodes during a predetermined time interval. This interval of time may be based on whether the acting node 110 has received a token or other indication indicating it is responsible for performing cap regulations for all the nodes. In one embodiment, the current acting node uses an inter-node communication method to notify next node to be the new acting node. In one embodiment, the sequence for each node to serve as the acting node is pre-defined; the pre-defined list is saved in a shared location; and every node has access to the list and knows its own order. Although the order is pre-defined, each node can choose not to be the acting node, if its current utilization is too high. When this happens, that node is responsible for notifying his next node to be the acting node. In another embodiment, acting node 110 performs power capping regulation in response to an occurrence of an event.

In one embodiment, only a subset of the nodes are able to become the acting node and perform the software power cap regulation. In one embodiment, the subset of nodes are faster nodes or have more processing capabilities than the other nodes. For example, in one embodiment, the 2 GHz nodes are used for power cap regulation while nodes that are half the speed (i.e., 1 GHz) always remain as non-acting nodes. Thus, in such a case, the assignment of a node to becoming an acting node is based on node speed.

In another embodiment, the assignment to the nodes is based on current work load. In such a case, when ready to assign a new node to be the acting node, an assessment is made as to which node's workload is best suited to absorb the additional processing that is necessary to perform the power cap regulation. In that case, the node with the lowest workload or node that is most able to absorb the workload associated with performing the power cap regulation becomes the acting node.

In one embodiment, cap regulation logic 121 comprises a PID controller. The PID controller generates values $K_P$, $K_1$, and $K_D$ that are used to control the nodes, such as acting node 110 and other non-acting nodes 11. Note that other forms of control may be used to generate the power control parameters that are used to control the other non-acting nodes. In one embodiment, the control values $K_P$, $K_1$, and $K_D$ represent state information of the power control state machine. When another node, such as one of nodes 111, is going to become the new acting node, and acting node 110 is going to become a non-acting node, then acting node 110 transfers these values to the node that is going to be the new acting node. In one embodiment, because acting node 110 doesn't know which of non-acting nodes is going to be the new acting node, acting node 110 transfers these values to all of the nodes that can become an acting node. In such a case, those nodes that are not going to be the next acting node simply ignore these values. Other values to be transferred include history data for computing the parameters to the new node.

Thus, the techniques described herein provide power capping and/or other power management for nodes that share a common power supply with the other nodes by having only one of the nodes run the power management logic at a time for all the nodes. This acting node sends power control parameters (e.g., power capping decisions) the non-acting nodes using one communications channel and the non-acting nodes apply them. Thus, these other non-acting nodes do not compute results for power cap regulation. By alternating the responsibility to perform power management control (e.g., power cap regulation) between each of the plurality of nodes, the burden is shared between the nodes.

While FIG. 1 illustrates a simplified view of a system, such as, for example, a server rack system, note that such an arrangement may be used as part of a High Power Computing in which the nodes are compute nodes that represent clusters of computers that are coupled together with an interconnect (e.g., Infiniband). In one embodiment, the arrangement comprises one or more head nodes, one or more compute nodes, one or more input-output (IO) nodes, one or more operating system (OS) nodes, and other nodes—coupled to a high speed fabric. In one embodiment, the compute nodes are central processing unit (CPU) nodes, the head node comprises one or more operating system (OS) nodes. The high-speed fabric may be a network topology of nodes interconnected via one or more switches. In one embodiment, each of the nodes comprises one or more processors, one or more controllers, or both coupled to a memory. In one embodiment, such an arrangement also includes one or more file servers with data storage and metadata servers for supporting the compute nodes. Also, the nodes may include individual computers in a cluster arrangement. In another embodiment, a compute node may include a system having the minimum operating system.

Figure 2:
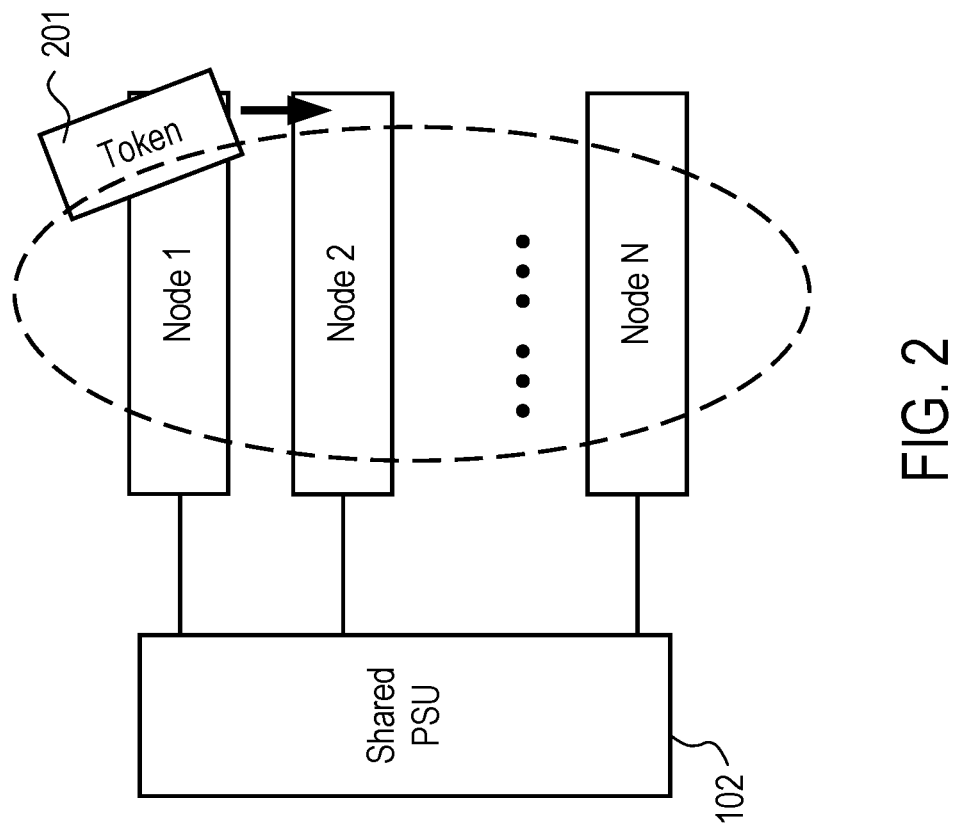
FIG. 2 illustrates an example assigning acting nodes and non-acting nodes.

FIG. 2 illustrates an example assigning acting nodes and non-acting nodes. In one embodiment, nodes with valid tokens become acting nodes and nodes without valid tokens will be non-acting nodes. Referring to FIG. 2, shared PSU 102 is coupled to nodes 1-N. Token 201 is passed between the nodes. In response to receiving the token 201, the node is the active node and responsible for performing the power management for all the nodes in the arrangement. In one embodiment, the active node that performs the power management performs power capping logic. As discussed above, if some nodes are faster than others, or if the overall power management overhead is small, designers and/or users can elect to use specific nodes to always be acting nodes, while certain nodes are not allowed to be inactive nodes.

Figure 3:
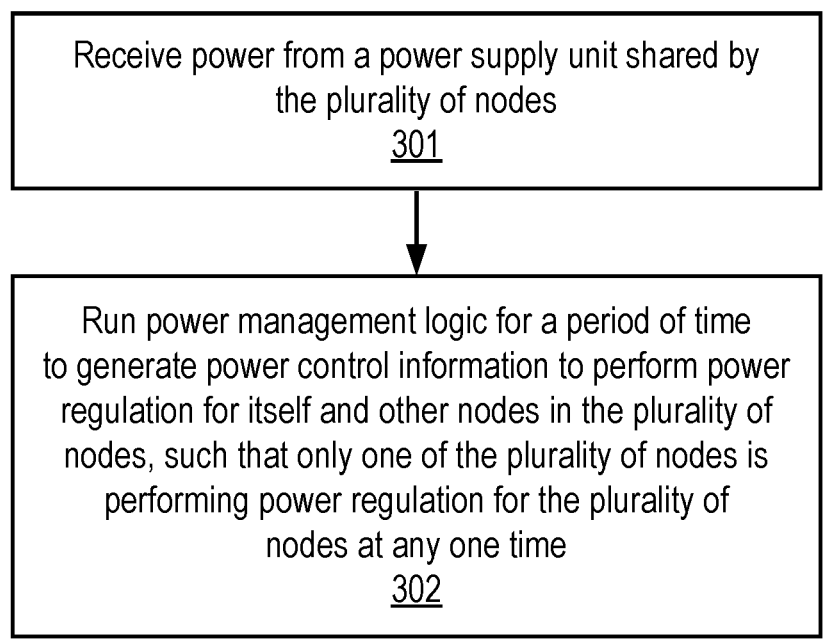
FIG. 3 is a flow diagram of one embodiment of a process for performing the power management process for a plurality of nodes.

FIG. 3 is a flow diagram of one embodiment of a process for performing the power management process for a plurality of nodes in a computing arrangement in which the plurality of nodes share a common supply of power. Each of the nodes is operable to run power management logic (e.g., power capping logic). The process is performed by processing logic that may comprise hardware (circuitry, dedicated logic, etc.), software (such as is run on a general purpose computer system or a dedicated machine), firmware, or a combination of these three.

Referring to FIG. 3, the process begins by processing logic in each of a plurality of nodes receiving power from a power supply unit shared by the plurality of nodes (processing block 301). While the plurality of nodes receives input power from the power supply unit, processing logic in each of the plurality of nodes runs power management logic for a period of time to generate power control information to perform power regulation for itself and other nodes in the plurality of nodes, such that only one of the plurality of nodes is performing power regulation for the plurality of nodes at any one time (processing block 302). In one embodiment, the period of time is predetermined. In another embodiment, the period of time is set based on the occurrence of an event.

Figure 4:
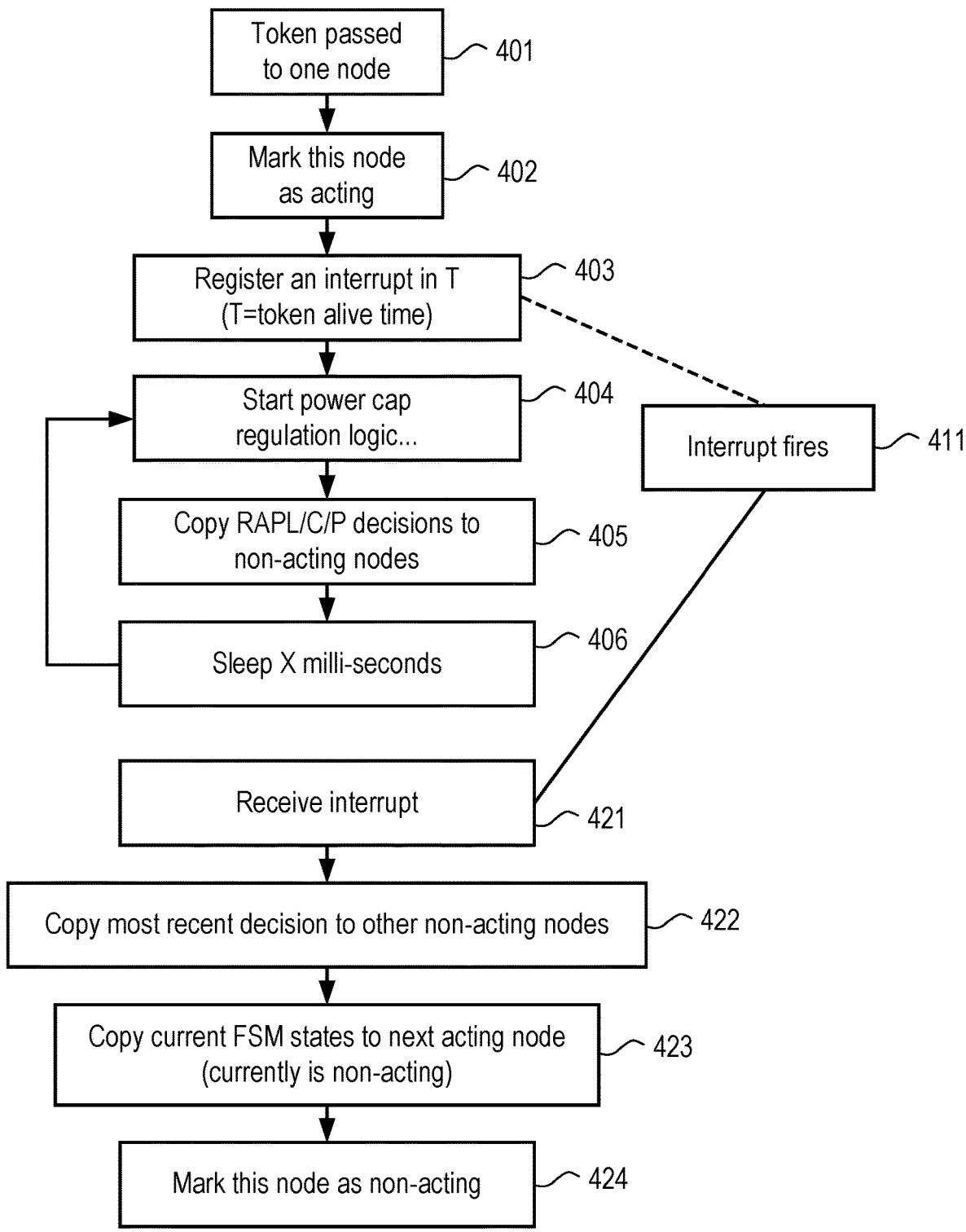
FIG. 4 illustrates a flow diagram of one embodiment of a process for performing power management process on a node.

FIG. 4 illustrates a flow diagram of one embodiment of a process for performing power management process on a node. The process is performed by processing logic that may comprise hardware (circuitry, dedicated logic, etc.), software (such as is run on a general purpose computer system or a dedicated machine), firmware, or a combination of these three.

Referring to FIG. 4, the process begins by passing a token to one node (processing block 401). In response to receiving the token, processing logic marks the node as the acting node (processing block 402). Also in response to marking the node as the acting node, processing logic registers an interrupt in T, where T equals the token lifetime (e.g., the amount of time the token is valid) (processing block 403). This value T sets the time for an interrupt to occur after time T has expired. It is during this time T that the node remains the acting node, and after time T expires, the token is passed to another node to become the acting node and the node that was the acting node will become a non-acting node.

After marking the node as the acting node and registering the interrupt, processing logic of the acting node starts power cap regulation logic (or other power management logic) (processing block 404). As a result of performing the power cap regulation, processing logic of the power cap regulation logic generates RAPL, C, and P power control parameters and sends these to the non-acting nodes (processing block 405). Thereafter, processing logic in the acting node sleeps a pre-determined period of time T before running the power cap regulation logic again (processing block 406). This predetermined period of time may be a number of milliseconds. The process is typically repeated every 10 ms to 1000 ms depending on the implementation. If time T is the same for all the nodes, then the time the nodes spend running their power management logic to control power for all the nodes is a fixed frequency.

After time T, the interrupt will occur (processing block 411). In one embodiment, the interrupt time T is approximately 500 milliseconds. Note that embodiments are not limited to this amount of time. For example, in other implementations, the interrupt time is 20 ms if RAPL is used and 50 ms if p-states are used. In one embodiment, time T is based on the occurrence of an event. That is, in another embodiment, the occurrence of an event causes the interrupt to fire. In one embodiment, this event is a significant change has occurred in the configuration. For example, if a second power supply unit comes up (e.g., a power supply goes from idle to active), the power cap computation may be performed and a new determination of which node should be the acting node may occur. In one embodiment, the configuration change comprises a removal or reduction of the CPU or other processing unit may cause the changing of the node that is the acting node among the nodes.

In response to the interrupt occurring, processing logic in the acting node receives the interrupt (processing block 421) and copies the most recent power control parameters to the other non-acting nodes (processing block 422). Processing logic in the acting nodes also copies the current finite state machine (FSM) state information to the next acting node (which is currently non-acting) (processing block 423) and marks itself as a non-acting node (processing block 424). In one embodiment, the state information includes all historical observed data and the intermediate state values. Using the current FSM state information with the most recent power control parameters, the new acting node is able to continue to perform the power cap regulation at the same place at which the previous acting node was. Thus, the state that had been obtained up to that point is not lost by changing which node is the new acting node.

Figure 5:
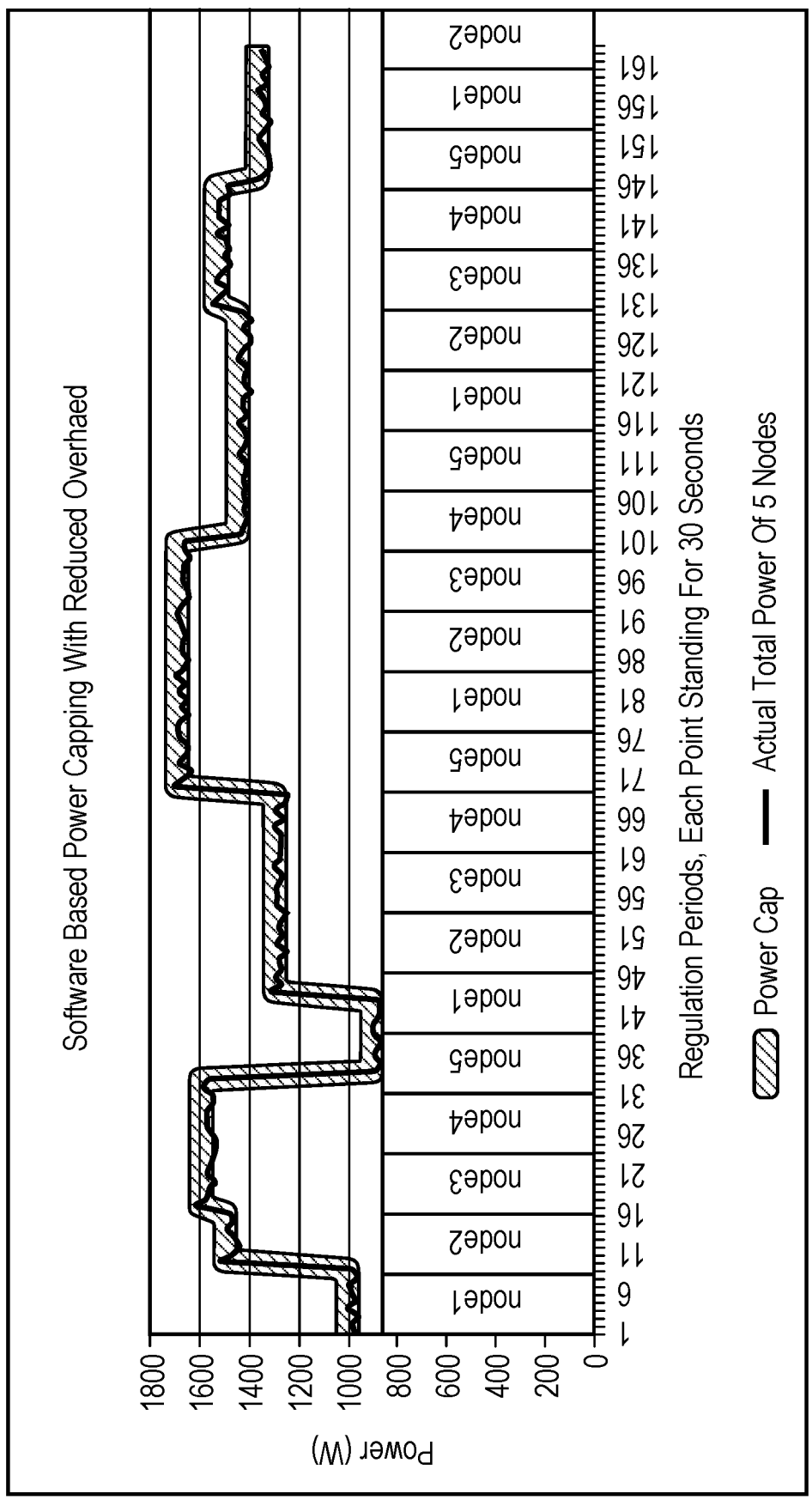
FIG. 5 demonstrates that the techniques described herein can closely and effectively follow rack power cap and reduce in-band power management overhead.

FIG. 5 demonstrates that the techniques described herein can closely and effectively follow rack power cap and reduce in-band power management overhead by 80% (take this 5-node blade as an example).

Figure 6:
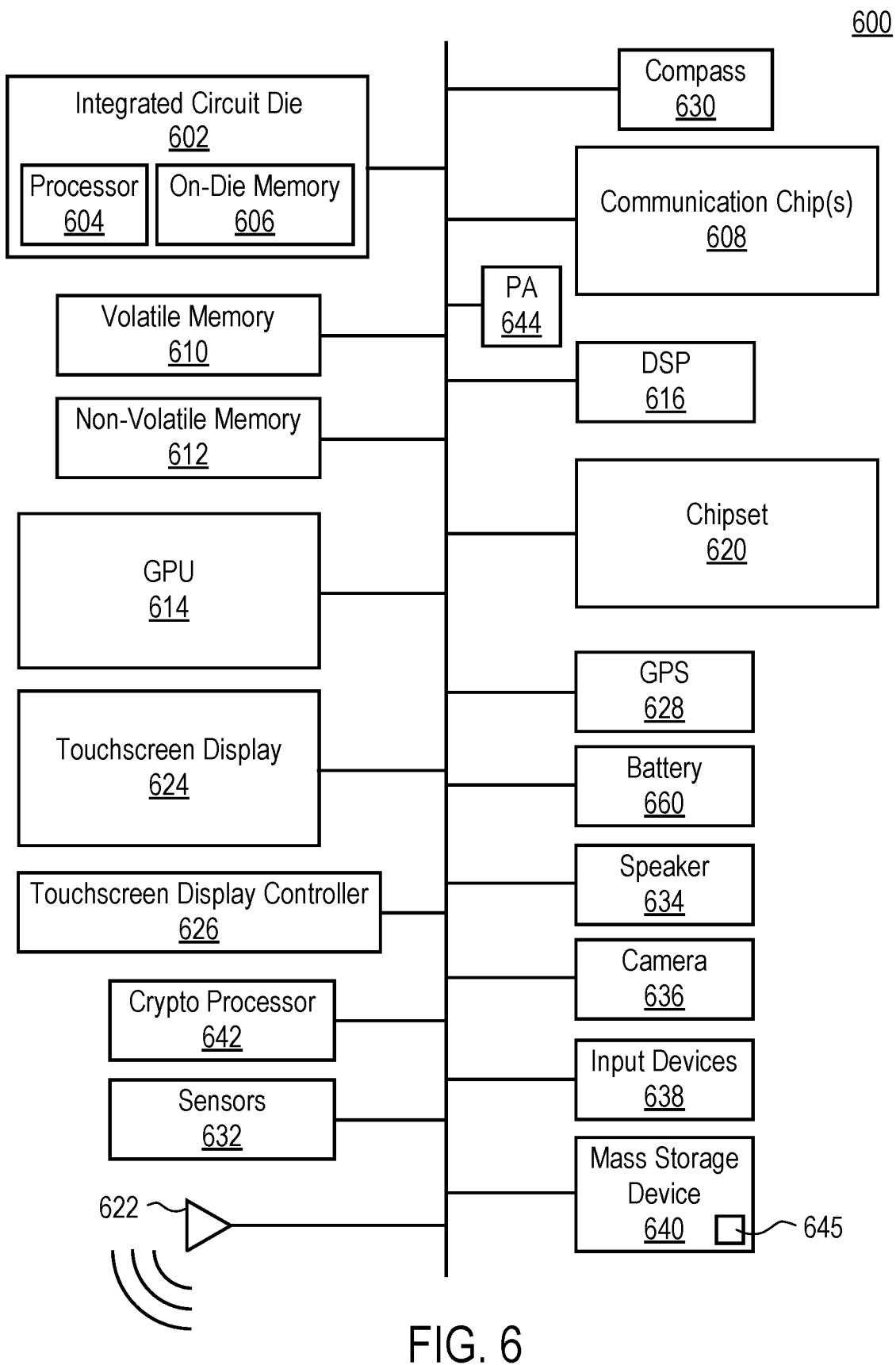
FIG. 6 illustrates a data processing system in accordance with one embodiment.

There are other advantage that the techniques described herein have over the traditional BMC/chassis manager solutions. These techniques can achieve improved power control performance at a lower cost. For example, traditional approach depends on a node manager to set node hard limit. The node manager responding time is in seconds. In contrast, these technique uses in-band power management software to do the same thing (e.g., setting RAPL limits), but can do it in milliseconds. Second, a traditional approach depends on BMC to poll the embedded power sensors to get node power and power supply power. The techniques described herein may be able to directly poll these power sensors with an in-band method via another device like the PCH removing the need of the added A node in the HPC system typically has a large number of cores (e.g., about 100 cores, or any other large number of cores). FIG. 6 illustrates a data processing system 600 in accordance with one embodiment. Data processing system 600 represents any data processing system to profile a job power, as described herein with respect to FIGS. 1-11. In alternative embodiments, the data processing system 600 may be connected (e.g., networked) to other machines in a Local Area Network (LAN), an intranet, an extranet, or the Internet. The data processing system 600 may operate in the capacity of a server or a client machine in a client-server network environment, or as a peer machine in a peer-to-peer (or distributed) network environment.

The data processing system 600 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that data processing system. Further, while only a single data processing system is illustrated, the term "data processing system" shall also be taken to include any collection of data processing systems that individually or jointly execute a set (or multiple sets) of instructions to perform any one or more of the methodologies described herein.

A processor 604 represents one or more general-purpose processing devices such as a microprocessor, central processing unit, or other processing device. More particularly, the processor 604 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 604 may also be one or more special-purpose processing devices such as an application specific integrated circuit (ASIC), a field programmable gate array (FPGA), a digital signal processor (DSP), network processor, or the like. Processor 604 is configured to control a processing logic for performing the operations described herein with respect to FIGS. 1-5.

The data processing system 600 may include a number of components. In one embodiment, these components are attached to one or more motherboards. In an alternate embodiment, these components are fabricated onto a single system-on-a-chip (SoC) die rather than a motherboard. The components in the data processing system 600 include, but are not limited to, an integrated circuit die 602 and at least one communication chip 608. In some implementations the communication chip 608 is fabricated as part of the integrated circuit die 602. The integrated circuit die 602 may include processor 604, an on-die memory 606, often used as cache memory, that can be provided by technologies such as embedded DRAM (eDRAM) or spin-transfer torque memory (STTM or STTM-RAM).

Data processing system 600 may include other components that may or may not be physically and electrically coupled to the motherboard or fabricated within an SoC die. These other components include, but are not limited to, a volatile memory 610 (e.g., DRAM), a non-volatile memory 612 (e.g., ROM or flash memory), a graphics processing unit 614 (GPU), a digital signal processor 616, a crypto processor 642 (a specialized processor that executes cryptographic algorithms within hardware), a chip set 620, an antenna 622, a display or a touchscreen display 624, a touchscreen controller 626, a battery 660 or other power source, a power amplifier (PA) 644, a global positioning system (GPS) device 628, a compass 630, sensors 632 (that may include one or more power measurement sensor to measure power as described above, and any other sensor), a speaker 634, a camera 636, user input devices 638 (such as a keyboard, mouse, stylus, and touchpad), and a mass storage device 640 (such as hard disk drive, compact disk (CD), digital versatile disk (DVD), and so forth).

The communications chip 608 enables wireless communications for the transfer of data to and from the data processing system 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 608 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The data processing system 600 may include a plurality of communication chips 608. For instance, a first communication chip 608 may be dedicated to shorter range wireless communications such as Wi-Fi and Bluetooth and a second communication chip 608 may be dedicated to longer range wireless communications such as GPS, EDGE, GPRS, CDMA, WiMAX, LTE, Ev-DO, and others. The term "processor" may refer to any device or portion of a device that processes electronic data from registers and/or memory to transform that electronic data into other electronic data that may be stored in registers and/or memory.

In various embodiments, the data processing system 600 may be a laptop computer, a netbook computer, a notebook computer, an ultrabook computer, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, a digital video recorder, or a part of the HPC system, cloud system, or any other data processing system. In further implementations, the data processing system 600 may be any other electronic device that processes data.

The mass storage device 640 may include a machine-accessible storage medium (or more specifically a computer-readable storage medium) 644 on which is stored one or more sets of instructions (e.g., a software) embodying any one or more of the methodologies or functions described herein. The software may also reside, completely or at least partially, within the memory 610, memory 612, memory 606 and/or within the processor 604 during execution thereof by the data processing system 600, the on-die memory 606 and the processor 604 also constituting machine-readable storage media. The software may further be transmitted or received over a network via a network interface device.

While the machine-accessible storage medium 644 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

In a first example embodiment, an apparatus comprises a power supply unit to provide input power and a plurality of nodes coupled to receive the input power, where each node of the plurality of nodes is operable to run power management logic, and wherein two or more nodes of the plurality of nodes alternate between performing power management and providing power regulation control information to other nodes of the plurality of nodes to regulate power consumption by the plurality of nodes, with, at any one time, only one node of plurality of nodes generating the power regulation control to regulate power for the plurality of nodes.

In another example embodiment, the subject matter of the first example embodiment can optionally include that the power regulation control information comprises information specifying one or more of processor and memory running average power limit (RAPL).

In another example embodiment, the subject matter of the first example embodiment can optionally include that the power management logic comprises power capping regulation logic.

In another example embodiment, the subject matter of the first example embodiment can optionally include that the power management capping regulation logic comprises a PID controller.

In another example embodiment, the subject matter of the first example embodiment can optionally include that each of the plurality of nodes has an input for the input power from the power supply unit for monitoring the input power, wherein the input power is identical to the plurality of nodes.

In another example embodiment, the subject matter of the first example embodiment can optionally include that alternating among the plurality of nodes is controlled by receipt of an indication, and wherein a node is operable to receive the indication and in response thereto perform its power management logic. In another example embodiment, the subject matter of this example embodiment can optionally include that the indication is a token or that the indication is indicative of an occurrence of an event or that the event comprises a configuration change.

In another example embodiment, the subject matter of the first example embodiment can optionally include that alternating among the plurality of nodes occurs based on an interrupt.

In another example embodiment, the subject matter of the first example embodiment can optionally include that alternating among the plurality of nodes occurs based on a fixed frequency wakeup interrupt.

In a second example embodiment, a method for use with a plurality of nodes that share a common supply of power, the method comprises receiving, by a first node of the plurality of nodes, a first indication and, in response to the receiving the indication, the first node temporarily performing power capping regulation for the plurality of nodes, including running power capping regulation logic to generate power control information to regulate power in the plurality of nodes including the first node and sending the power control information to nodes in the plurality of nodes other than the first node.

In another example embodiment, the subject matter of the second example embodiment can optionally include that the first node temporarily performing power regulation for the plurality of nodes comprises performing power regulation while the indication is valid. In another example embodiment, the subject matter of this example embodiment can optionally include that the first indication is a token or the first indication is valid for a predetermined period of time.

In another example embodiment, the subject matter of the second example embodiment can optionally include that the power control information comprises a running average power limit (RAPL). In another example embodiment, the subject matter of this example embodiment can optionally include that the RAPL is one or both of a processor RAPL and a memory RAPL.

In another example embodiment, the subject matter of the second example embodiment can optionally include sending power control parameters and power management state information to another of the plurality of nodes that is to start running power management logic to control the plurality of nodes. In another example embodiment, the subject matter of this example embodiment can optionally include that sending the power control parameters and the power management state information occurs in response to expiration of a period of time, sending the power control parameters and the power management state information occurs in response to an interrupt, or sending the power control parameters and the power management state information occurs in response to occurrence of an event.

In a third example embodiment, an article of manufacture has one or more non-transitory computer readable media storing instructions which, when executed by a system, cause the system to perform a method for use with a plurality of nodes that share a common supply of power, the method comprising: receiving, by a first node of the plurality of nodes, a first indication and, in response to the receiving the indication, the first node temporarily performing power capping regulation for the plurality of nodes, including running power capping regulation logic to generate power control information to regulate power in the plurality of nodes including the first node and sending the power control information to nodes in the plurality of nodes other than the first node.

In another example embodiment, the subject matter of the third example embodiment can optionally include that the first node temporarily performing power regulation for the plurality of nodes comprises performing power regulation while the indication is valid. In another example embodiment, the subject matter of this example embodiment can optionally include that the first indication is a token that is valid for a predetermined period of time.

In another example embodiment, the subject matter of the third example embodiment can optionally include that the power control information comprises a running average power limit (RAPL).

In a fourth example embodiment, a method for use with a plurality of nodes that share a common supply of power, where each of the nodes is operable to run power management logic, comprises: each of a plurality of nodes receiving power from a power supply unit shared by the plurality of nodes; and each of the plurality of nodes running power management logic for a period of time to generate power control information to perform power regulation for itself and other nodes in the plurality of nodes, such that only one of the plurality of nodes is performing power regulation for the plurality of nodes at any one time.

In another example embodiment, the subject matter of the fourth example embodiment can optionally include one of the plurality of nodes performing power regulation for itself and other nodes sending power control parameters and power management state information to another of the plurality of nodes that is to start running power management logic to control the plurality of nodes.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
a power supply unit to provide input power; and
a plurality of nodes coupled to receive the input power, each node of the plurality of nodes operable to run power management logic, and wherein two or more nodes of the plurality of nodes alternate between performing power management for other nodes of the plurality of nodes and providing power regulation control information to the other nodes of the plurality of nodes to regulate power consumption by the plurality of nodes, with, at any one time, only one node of the plurality of nodes generating the power regulation control to regulate power for the plurality of nodes, wherein a first node of the two or more nodes is operable to transfer power management state information related to state of the power management logic including historically observed and intermediate power management state values to a second node of the two or more nodes when the second node is to take over responsibility from the first node for performing the power management for the other nodes, wherein the plurality of nodes are compute nodes of a server rack, or a distributed network environment, or a compute cluster.

2. The apparatus defined in claim 1 wherein the power regulation control information comprises information specifying one or more of processor and memory running average power limit (RAPL).

3. The apparatus defined in claim 1 wherein the power management logic comprises power capping regulation logic.

4. The apparatus defined in claim 3 wherein the power management capping regulation logic comprises a PID controller.

5. The apparatus defined in claim 1 wherein each of the plurality of nodes has an input for the input power from the power supply unit for monitoring the input power, wherein the input power is identical to the plurality of nodes.

6. The apparatus defined in claim 1 wherein alternating among the plurality of nodes is controlled by receipt of an indication, and wherein a node is operable to receive the indication and in response thereto perform its power management logic.

7. The apparatus defined in claim 6 wherein the indication is a token.

8. The apparatus defined in claim 6 wherein the indication is indicative of an occurrence of an event.

9. The apparatus defined in claim 6 wherein the event comprises a configuration change.

10. The apparatus defined in claim 1 wherein alternating among the plurality of nodes occurs based on an interrupt.

11. The apparatus defined in claim 1 wherein alternating among the plurality of nodes occurs based on a fixed frequency wakeup interrupt.

12. A method for use with a plurality of nodes that share a common supply of power, the method comprising:
receiving, by a first node of the plurality of nodes, a first indication;
receiving power management state information related to state of power capping regulation logic from a second node of the plurality of nodes when the first node is to take over responsibility from the second node for performing power management for and providing the power regulation control information to nodes of the plurality of nodes; and
in response to receiving the indication and the power management state information, the first node temporarily performs power capping regulation for the plurality of nodes in operation, including running the power capping regulation logic comprising a PID controller with the power management state information to generate power control information to regulate power in the plurality of nodes including the first node and sending the power control information to nodes in the plurality of nodes other than the first node.

13. The method defined in claim 12 wherein the first node temporarily performing power regulation for the plurality of nodes comprises performing power regulation while the indication is valid.

14. The method defined in claim 13 wherein the first indication is a token.

15. The method defined in claim 13 wherein the first indication is valid for a predetermined period of time.

16. The method defined in claim 12 wherein the power control information comprises a running average power limit (RAPL).

17. The method defined in claim 16 wherein the RAPL is one or both of a processor RAPL and a memory RAPL.

18. The method defined in claim 12 further comprising sending power control parameters and power management state information to another of the plurality of nodes that is to start running power management logic to control the plurality of nodes.

19. The method defined in claim 18 wherein sending the power control parameters and the power management state information occurs in response to expiration of a period of time.

20. The method defined in claim 18 wherein sending the power control parameters and the power management state information occurs in response to an interrupt.

21. The method defined in claim 18 wherein sending the power control parameters and the power management state information occurs in response to occurrence of an event.

22. An article of manufacture having one or more non-transitory computer readable media storing instructions which, when executed by a system, cause the system to perform a method for use with a plurality of nodes that share a common supply of power, the method comprising:
receiving, by a first node of the plurality of nodes, a first indication
receiving power management state information related to state of power capping regulation logic from a second node of the plurality of nodes when the first node is to take over responsibility from the second node for performing power management for the plurality of nodes and providing the power regulation control information to nodes of the plurality of nodes; and
in response to receiving the indication and the power management state information, the first node temporarily performs power capping regulation for the plurality of nodes in operation, including running the power capping regulation logic with the power management state information including historically observed and intermediate power management state values to generate power control information to regulate power in the plurality of nodes including the first node and sending the power control information to nodes in the plurality of nodes other than the first node.

23. The article of manufacture defined in claim 22 wherein the first node temporarily performing power regulation for the plurality of nodes comprises performing power regulation while the indication is valid.

24. The article of manufacture defined in claim 23 wherein the first indication is a token that is valid for a predetermined period of time.

25. The article of manufacture defined in claim 24 wherein the power control information comprises a running average power limit (RAPL).

26. A method for use with a plurality of nodes that share a common supply of power, wherein each of the nodes is operable to run power management logic, the method comprising:
each of a plurality of nodes receiving power from a power supply unit shared by the plurality of nodes; and
each of the plurality of nodes running power management logic for a period of time to generate power control information and to perform power regulation for itself and other nodes in the plurality of nodes in operation, such that only one of the plurality of nodes is performing power regulation for the plurality of nodes at any one time, including each of the plurality of nodes receiving power management state information related to state of power management logic including historically observed and intermediate power management state values from one node of the plurality of nodes when said each node is to take over responsibility from the one node for performing power management for the plurality of nodes and providing the power regulation control information to the plurality of nodes, wherein the plurality of nodes are compute nodes of a server rack, or a distributed network environment, or a compute cluster.

27. The method defined in claim 26 further comprising one of the plurality of nodes performing power regulation for itself and other nodes sending power control parameters and power management state information to another of the plurality of nodes that is to start running power management logic to control the plurality of nodes.

* * * * *